US006089584A

United States Patent [19]

Cobb

[11] Patent Number: 6,089,584

[45] Date of Patent: Jul. 18, 2000

[54] ROLLING FRAME TO HOLD ROCKING CHAIR

[76] Inventor: Stanley B. Cobb, 16 Shillings Rd., Drew, Miss. 38737-9526

[21] Appl. No.: 09/249,157

[22] Filed: Feb. 12, 1999

Related U.S. Application Data

[60] Provisional application No. 60/112,069, Dec. 14, 1998.

[51] Int. Cl.[7] .......... B62M 1/14

[52] U.S. Cl. .......... 280/250.1; 280/304.1; 280/47.4

[58] Field of Search .......... 280/304.1, 250.1, 280/35, 47.38, 47.4, 7.15, 7.17, 33.993, 657, 47.34, 47.41

[56] References Cited

U.S. PATENT DOCUMENTS

| | | | |
|---|---|---|---|
| 305,061 | 9/1884 | Ellis et al. . | |
| 1,700,009 | 1/1929 | Willner, Sr. . | |
| 3,041,081 | 6/1962 | Lott . | |
| 3,216,738 | 11/1965 | Bockus . | |
| 3,945,449 | 3/1976 | Ostrow . | |
| 4,405,142 | 9/1983 | Whetstine | 280/250.1 |
| 4,506,901 | 3/1985 | Tosti | 280/242 |
| 4,934,719 | 6/1990 | duPont . | |
| 5,230,524 | 7/1993 | Jackson | 280/47.38 |
| 5,564,786 | 10/1996 | Peek et al. | 280/250.1 |
| 5,568,933 | 10/1996 | Mizuno | 280/42 |

FOREIGN PATENT DOCUMENTS

| | | | |
|---|---|---|---|
| 153554 | 3/1951 | Austria | 280/47.38 |
| 1113279 | 3/1956 | France . | |

*Primary Examiner*—Brian L. Johnson
*Assistant Examiner*—Avraham H. Lerner
*Attorney, Agent, or Firm*—Richard C. Litman

[57] ABSTRACT

A hand wheeled cart attachment for a "rocker glider" chair or the like with a wooden frame having a foot rest, casters in the front end and large hand wheels in the rear.

4 Claims, 2 Drawing Sheets

ROLLING FRAME TO HOLD ROCKING CHAIR

CROSS-REFERENCE TO RELATED APPLICATION

This application claims the benefit of U.S. Provisional Patent Application Ser. No. 60/112,069, filed Dec. 14, 1998.

BACKGROUND OF THE INVENTION

1. Field of the Invention

The present invention relates generally to a wheeled attachment for a chair and, more specifically, to a wooden frame with a foot rest, swiveling caster wheels in the front, and large twenty-four inch diameter rubber tire wheels with hand rings in the rear. The wooden frame supports a removable glide rocker or chair which fits between the wooden guides on the sides. The rolling frame converts any type of chair into a movable wheelchair.

2. Description of Related Art

The invention which I prefer to call the "rollachair" is made to accommodate a rocker glider chair or any comfortable or favorite chair for non-ambulatory people to roll around a domiciliary or nursing home. The advantages reside in utilizing a more comfortable chair than a standard wheelchair and being able to exercise by rocking in the rocker glider chair.

The related art of interest describes various wheeled attachments for chairs. The related art will be discussed in the order of perceived relevance to the present invention.

U.S. Pat. No. 3,945,449 issued on Mar. 23, 1976, to Henry J. Ostrow describes a wheeled attachment for a chair in a first embodiment comprising a rectangular frame with-casters in front with a retractable foot rest and larger diameter drive wheels in the rear hand propelled by a hand wheel and hand grip through a belt for each rear wheel. The legs of a lounge chair are placed in sockets at each corner of the frame. A second embodiment in FIGS. 6 and 7 utilizes a pair of large wheels with circular hand wheels. The wheel attachment is distinguishable for utilizing a rectangular metal frame formed from angle iron members with corner sockets for the lounge chair and a retractable foot rest.

U.S. Pat. No. 3,216,738 issued on Nov. 9, 1965, to Charles R. Bockus describes chairs for non-ambulatory persons for placement on a conventional wheeled converter frame. The frame consists of two front leg members on swivel casters joined by a cross member on top. The front legs are each joined to an L-shaped frame member which supports the axle for the wheels with hand wheels. The distal ends of the L-shaped frame members have pins which engage the novel chair with a slidable post on its seat. The wheeled converter frame is distinguishable for a tubular metal coverter frame.

U.S. Pat. No. 1,700,009 issued on Jan. 22, 1929, to Ernest A. Willner, Sr. describes an invalid-chair truck formed with a rectangular shaped frame with each frame side having two non-locking expansible channel members. At each corner a post holds a rotatable and tiltable plate member with two apertures on top to secure a chair leg. A rotatable caster wheel is attached at the bottom of each corner post. The invalid-chair truck claimed as a furniture truck is distinguishable for its expansible channel members and the permanent attachable plate members required to secure a leg of a chair.

U.S. Pat. No. 3,041,081 issued on Jun. 26, 1962, Eugene W. Lott describes a wheeled attachment for a rocking chair which can retract its wheels. A square metal frame has two end rails (front and rear) and two side rails. Each end rail has a pair of castered wheels. The front end rail has a retractable U-shaped tubular footrest. Each end rail has a guide rod which engage upstanding projections with slots of a vertically positioned U-shaped guide bar parallel to each side rail. A lever attached to the rear rail can elevate or lower the square frame. The wheeled metal frame is distinguishable for its elevation mechanism.

U.S. Pat. No. 4,934,719 issued on Jun. 19, 1990, to Emile M. duPont describes a wheeled attachment to a folding lawn chair for use as a cart for hauling articles and not people. A wheel assembly on an axle is strapped to the rear of a lawn chair by brackets on the axle and on the top crosspiece of the back of the lawn chair. The wheeled attachment device is distinguishable for its limited application as a two-wheeled cart enabling attachment.

France Patent No. 1,113,279 issued on Mar. 26, 1956, to M. Lucien-Ernest Fosse describes an infant's roller chair transformed into a rocking chair by attaching rotatable curved levers or extensions on each of four wheels to elevate the wheels. The infant roller chair attachment is distinguishable for its different rocking chair structure.

None of the above inventions and patents, taken either singly or in combination, is seen to describe the instant invention as claimed.

SUMMARY OF THE INVENTION

The present invention is a wheeled attachment for a chair, made up of a wooden frame with a foot rest, swiveling caster wheels in the front, and large twenty-four inch diameter rubber tire wheels with hand rings in the rear. The wooden frame supports any chosen glide rocker or chair which fits between the wooden guides on the sides, and is removable from the invention. Thus, the rolling frame converts any type of chair into a movable wheelchair.

Accordingly, it is a principal object of the invention to provide a rolling frame for holding a rocking-glider chair or any other chair.

It is another object of the invention to provide a rolling frame made substantially of wood.

It is a further object of the invention to provide a rolling frame with a pair of caster wheels in front and a large hand wheels in the rear.

Still another object of the invention is to provide a footrest in front of the rolling frame.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
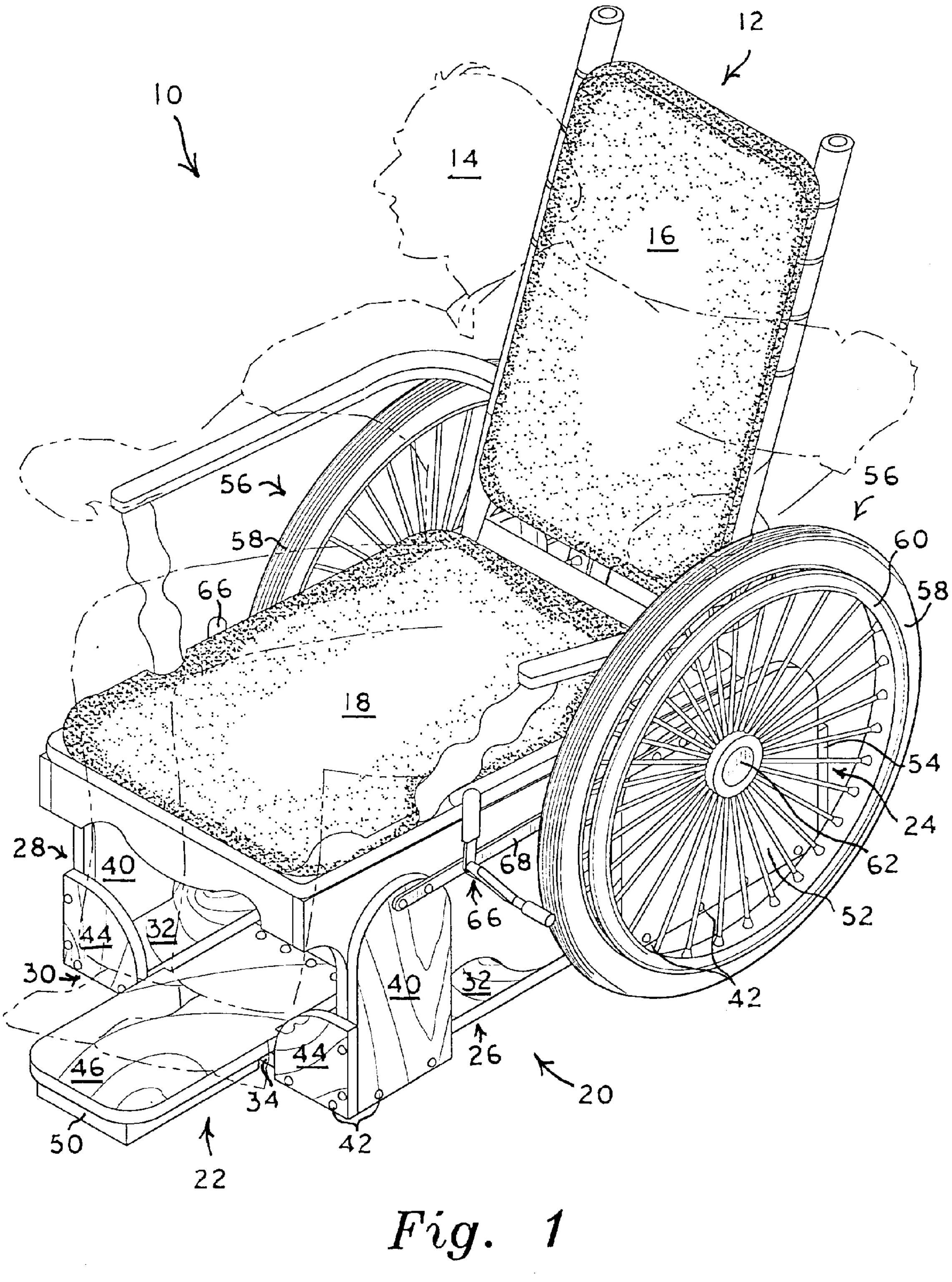
FIG. 1 is an environmental, perspective view of a rolling frame to hold a rocker glider chair and person according to the present invention.
Figure 2:
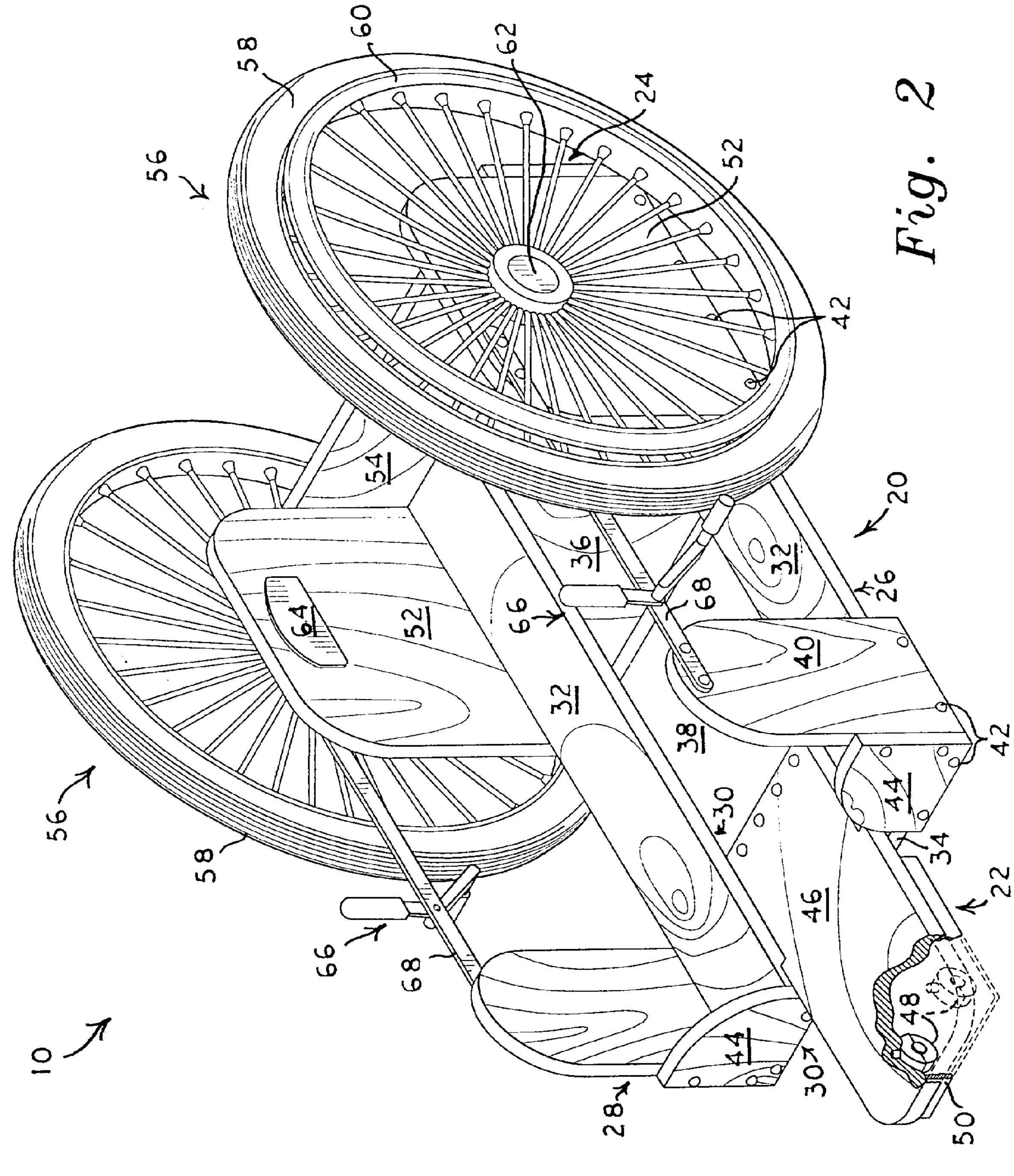
FIG. 2 is a perspective view of a rolling frame to hold a rocker glider according to the present invention.

The present invention in FIGS. 1 and 2 are directed to a rolling frame apparatus or "rollachair" 10 to hold a rocker glider chair or any chair 12 having a non-ambulatory person 14 (in shadow) seated against a padded seatback 16 and on a padded seat 18. The apparatus 10 comprises a rectangular wooden frame 20 having a front end 22, a rear end 24, two sides 26 (right) and 28 (left), and a bottom 30. A pair of parallel bottom boards 32 of the frame 20 are horizontally positioned for supporting the chair 12. The ends of the parallel bottom boards 32 are supported underneath by a front crosspiece board 34 and a rear crosspiece board 36 to form the basic bottom portion of the frame 20 and define a central space 38.

Front side boards 40 with rounded tops are positioned vertically on each of the two sides 26 and 28 of the frame 20 at the corners of the front end 22 and attached to the front crosspiece board 34 by fasteners 42. A pair of quarter circle boards 44 has the straight edges of each board attached by fasteners 42 to each front crosspiece board 34 and each adjacent front side board 40 with the rounded tops to form a front corner of the frame 20.

A footrest board 46 is positioned between the quarter circle boards 44 and rests on the front crosspiece board 34. A pair of swiveling caster wheels 48 are positioned in a front portion, on a bottom surface thereof, and at corners of the footrest board 46. A wooden skirt 50 surrounds the exposed edges of the footrest board 46 to shield the caster wheels 48 from sight and to prevent any accidental encumberance with a foreign object.

The bottom edges of a pair of rectangular rear side boards 52 are attached by fasteners 42 to the rear horizontal crosspiece board 36. A rear vertical crosspiece board 54 is attached to a rear portion of each rear side board 52 and to the rear crosspiece board 36 for reinforcement of the rear end 24.

A pair of rear hand wheels 56 comprising a rubber tire 58 with a diameter of, e.g., 24 in., and a smaller diameter hand wheel ring 60 are attached to the outside surface of each rear side board 52 by a bolt for an axle 62. A threaded galvanized steel plate 64 is positioned on an inner surface of each rear side board 52 for accepting the axle 62.

A hand brake element 66 proximate each rubber tire 58 is located on a horizontal metal strap 68 attached between each front side board 40 and each rear side board 52 on both sides of the frame 20. The strap 68 also functions to reinforce the front side boards 40 and the rear side boards 52.

Thus, an economical wooden rolling frame apparatus has been shown which allows an occupant in one's own chair to move about as with one in a wheel chair.

It is to be understood that the present invention is not limited to the sole embodiment described above, but encompasses any and all embodiments within the scope of the following claims.

I claim:

1. A rolling frame to hold a chair comprising:

a rectangular wooden frame having a front end, a rear end, two sides, and a bottom;

a pair of horizontal bottom boards arranged in parallel to form the two sides of the frame;

a horizontal front crosspiece board and a horizontal rear crosspiece board underneath the pair of horizontal bottom boards, joining the pair of horizontal bottom boards for supporting the chair and defining a central space;

a pair of boards with rounded tops positioned vertically on each of the two sides of the frame at the corners of the front end and attached to the horizontal front crosspiece board;

a pair of vertical quarter circle boards with its straight edges of each board attached to the horizontal front crosspiece board and to the vertical boards with rounded tops;

a footrest board positioned between the quarter circle boards and the horizontal bottom boards rests on the front crosspiece;

a pair of swiveling caster wheels with each wheel positioned in a front portion, on a bottom surface thereof, and at corners of the footrest board;

a pair of vertical rectangular rear side boards with its bottom edges attached to the bottom boards;

a rear crosspiece board attached to a rear portion of each rear side board and to the bottom board for reinforcement;

a pair of rear hand wheels, each wheel mounted on an axle, and each wheel comprising a larger diameter rubber tire and a smaller diameter hand wheel ring, each rear hand wheel attached by the axle to each rear side board; and a hand brake element proximate each rubber tire located on a horizontal metal strap attached between each front side board and rear side board;

whereby a chair can be carried by the rolling frame and maneuvered by a sitting occupant.

2. The rolling frame according to claim 1, including a steel plate positioned on an inner surface of each rear side board for supporting the axle.

3. The rolling frame according to claim 1, wherein the chair is a rocker glider chair.

4. The rolling frame according to claim 1, including a wooden skirt being attached to the footrest along three exposed sides for providing security from entanglement of the swiveling caster wheels with any foreign object.

* * * * *